(12) United States Patent
Höppner et al.

(10) Patent No.: US 11,183,224 B2
(45) Date of Patent: *Nov. 23, 2021

(54) METHOD AND AN APPARATUS FOR REDUCING THE EFFECT OF LOCAL PROCESS VARIATIONS OF A DIGITAL CIRCUIT ON A HARDWARE PERFORMANCE MONITOR

(71) Applicant: RACYICS GMBH, Dresden (DE)

(72) Inventors: Sebastian Höppner, Dresden (DE); Jörg Schreiter, Markkleeberg (DE)

(73) Assignee: RACYICS GMBH, Dresden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/635,775

(22) PCT Filed: Apr. 10, 2018

(86) PCT No.: PCT/EP2018/059135
§ 371 (c)(1),
(2) Date: Jan. 31, 2020

(87) PCT Pub. No.: WO2019/025037
PCT Pub. Date: Feb. 7, 2019

(65) Prior Publication Data
US 2020/0379042 A1 Dec. 3, 2020

(30) Foreign Application Priority Data

Aug. 4, 2017 (DE) .................. 10 2017 117 745.0
Aug. 4, 2017 (DE) .................. 10 2017 117 772.8
(Continued)

(51) Int. Cl.
*G01R 31/317* (2006.01)
*G01R 31/28* (2006.01)
(Continued)

(52) U.S. Cl.
CPC .......... *G11C 5/146* (2013.01); *G01R 31/2856* (2013.01); *G01R 31/31712* (2013.01);
(Continued)

(58) Field of Classification Search
CPC ........ G01R 31/31712; G01R 31/31725; G01R 31/31718
See application file for complete search history.

(56) References Cited

U.S. PATENT DOCUMENTS 5,568,377 A * 10/1996 Seem ..................... G05B 11/42
700/28
6,011,668 A * 1/2000 Choi .................... G11B 5/5547
360/78.06
(Continued)

FOREIGN PATENT DOCUMENTS

DE 102013206300 B4 10/2014
WO 2019025030 A1 2/2019

OTHER PUBLICATIONS

International Preliminary Report on Patentability issued in PCT/EP2018/059135 and dated Feb. 13, 2020.
(Continued)

*Primary Examiner* — Douglas Kay
(74) *Attorney, Agent, or Firm* — Heslin Rothenberg Farley & Mesiti P.C.

(57) ABSTRACT

A method and an apparatus for reducing an effect of local process variations of a digital circuit on a hardware performance monitor includes measuring a set of performance values ($c_1, c_2 \ldots c_n$) of the digital circuit by n identical hardware performance monitors, where n is a natural number greater than 1, determining an average value $c_{mean}$ of the measured performance values ($c_1, c_2 \ldots c_n$), as an approximation of an ideal performance value $c_0$, selecting one performance value $c_j$ of the set of performance values ($c_1, c_2 \ldots c_n$) by a controller, comparing the performance value
(Continued)

Figure 1:
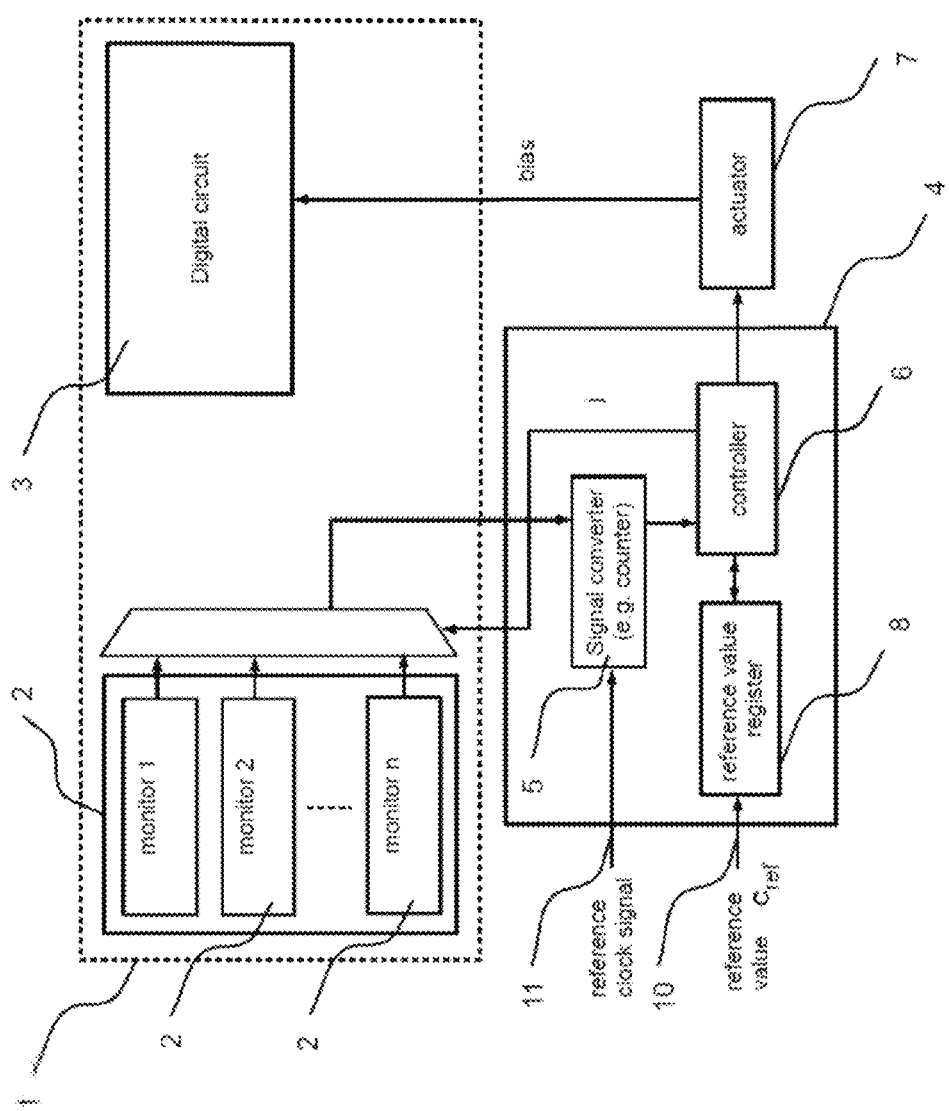

$c_j$ with a reference value $c_{ref}$ by a controller the controller, resulting in a deviation value $\Delta c$, and controlling an actuator by using the deviation $\Delta c$ for regulating the local global process variations to the approximation $c_{mean}$ of the ideal performance value $c_0$.

33 Claims, 2 Drawing Sheets

(30) Foreign Application Priority Data

Aug. 22, 2017 (DE) .................. 10 2017 119 111.9
Oct. 27, 2017 (DE) .................. 10 2017 125 203.7

(51) Int. Cl.
| | |
|---|---|
| *G11C 5/14* | (2006.01) |
| *G05F 3/20* | (2006.01) |
| *G06F 11/30* | (2006.01) |
| *G06F 11/34* | (2006.01) |
| *G06F 30/20* | (2020.01) |
| *G06F 30/3312* | (2020.01) |
| *G06F 30/398* | (2020.01) |
| *G06F 30/39* | (2020.01) |
| *G06F 30/337* | (2020.01) |
| *G06F 30/30* | (2020.01) |
| *H03K 3/03* | (2006.01) |
| *G06F 119/08* | (2020.01) |
| *G06F 119/06* | (2020.01) |
| *G06F 119/12* | (2020.01) |
| *G06F 30/3308* | (2020.01) |

(52) U.S. Cl.
CPC . *G01R 31/31718* (2013.01); *G01R 31/31725* (2013.01); *G05F 3/205* (2013.01); *G06F 11/3013* (2013.01); *G06F 11/3423* (2013.01); *G06F 30/20* (2020.01); *G06F 30/30* (2020.01); *G06F 30/337* (2020.01); *G06F 30/3312* (2020.01); *G06F 30/39* (2020.01); *G06F 30/398* (2020.01); *H03K 3/0315* (2013.01); *G06F 30/3308* (2020.01); *G06F 2119/06* (2020.01); *G06F 2119/08* (2020.01); *G06F 2119/12* (2020.01)

(56) References Cited

U.S. PATENT DOCUMENTS

| | | | |
|---|---|---|---|
| 8,010,317 B1* | 8/2011 | Pennanen | G06F 1/3203 |
| | | | 702/182 |
| 8,531,225 B1* | 9/2013 | Hussain | H03K 5/133 |
| | | | 327/276 |
| 9,754,640 B1* | 9/2017 | Yang | G11C 13/004 |
| 9,865,486 B2* | 1/2018 | Arsovski | H01L 21/67253 |
| 2004/0165622 A1* | 8/2004 | Lu | H04B 10/504 |
| | | | 372/29.021 |
| 2004/0254762 A1* | 12/2004 | Hopkins | H01L 21/67288 |
| | | | 702/182 |
| 2006/0066388 A1* | 3/2006 | Tschanz | G05F 3/205 |
| | | | 327/534 |
| 2012/0257674 A1* | 10/2012 | Macq | H04N 19/152 |
| | | | 375/240.12 |
| 2014/0266251 A1* | 9/2014 | Chevroulet | G01D 5/24 |
| | | | 324/661 |
| 2015/0048860 A1 | 2/2015 | Bickford et al. | |
| 2017/0188144 A1 | 6/2017 | Vinter | |
| 2017/0287756 A1* | 10/2017 | Arsovski | H01L 21/67271 |

OTHER PUBLICATIONS

R. Carter et al., "22nm FDSOI Technology for Emerging Mobile, Internet-of-Things, and RF Applications", IEEE International Electron Devices Meeting (IEDM), San Francisco, CA, 2016, pp. 2.2 1-2.2.4.
International Search Report and Written Opinion issued in PCT/EP2018/059135 and dated Jun. 28, 2019.

* cited by examiner

METHOD AND AN APPARATUS FOR REDUCING THE EFFECT OF LOCAL PROCESS VARIATIONS OF A DIGITAL CIRCUIT ON A HARDWARE PERFORMANCE MONITOR

CROSS REFERENCE TO RELATED APPLICATIONS

This application is the National Phase filing under 35 U.S.C. § 371 of International Application No. PCT/EP2018/059135, filed on Apr. 10, 2018, and published on Feb. 7, 2019 as WO 2019/025037 A1, which claims priority to German Application No. 102017117772.8, filed on Aug. 4, 2017, and German Application No. 102017117745.0, filed on Aug. 4, 2017, and German Application No. 102017119111.9, filed on Aug. 22, 2017, and German Application No. 102017125203.7, filed Oct. 27, 2017. The contents of each of the prior applications are hereby incorporated by reference herein in their entirety.

The invention relates to a method for reducing the effect of local process variations of a digital circuit on a hardware performance monitor.

The invention also relates to an apparatus for reducing the effect of local process variations of a digital circuit on a hardware performance monitor.

BACKGROUND

Hardware performance monitors, as disclosed for example in DE 102013206300 B4, are used in microelectronic circuits to measure the hardware performance (e.g. logic speed) during system operation. This measurement enables adaptive control schemes, which adapt operational parameters, such as supply voltage (adaptive voltage scaling as in DE 102013206300 B4) or body bias voltages (adaptive body bias scaling as in DE 10 2017 117 772.8). Such active control is advantageous in Fully Depleted Silicon-On-Isolator CMOS technologies (FDSOI). An overview of the Silicon-On-Insulator (SOI) CMOS technologies is exemplary published in R. Carter et al., "22 nm FDSOI technology for emerging mobile, Internet-of-Things, and RF applications," 2016 IEEE International Electron Devices Meeting (IEDM), San Francisco, Calif., 2016, pp. 2.2.1-2.2.4. doi: 10.1109/IEDM.2016.7838029.

Hardware performance monitor circuits are typically comprised of the same type of logic gates as the function circuits to be monitored. They can either replicate the performance of a dedicated functional logic component or measure the general performance of the integrated circuit to compare it with an expected (ideal) reference performance.

In both cases, the hardware performance monitor read-out and consequently the regulation scheme can be corrupted by local process variations. Local manufacturing variations lead to mismatch between performance values within the monitor and the functional design. This mismatch cannot be compensated by regulation, since the design itself is typically not monitored.

State of the art is the usage of single monitor circuit instances (hardware performance monitors). Based on their results, supply voltage or body bias voltages are controlled adaptively.

The accuracy of hardware performance monitors operated at low power and/or low supply voltages suffers significantly from local process variations, which result in mismatch between the monitor circuit and the design which is to be monitored. Accounting for this mismatch leads to introducing additional safety margins in the regulated bias (e.g. supply voltage or body bias voltage) that must in turn be considered in the design of the monitored digital circuit to guarantee functionality under given timing constraints. This leads to an over-constraining of the design during implementation time, called pessimism, resulting in performance loss, higher area consumption or higher power consumption.

The impact of local process variations on single instance hardware performance monitor circuits can be reduced by increasing their active device area (e.g. transistor length and width), but at cost of power consumption and chip-area.

The disadvantages can be seen in an increase of power consumption and chip-area.

It is therefore the object of the invention to find a method and apparatus which both are able to reduce the mismatch between the read-out hardware performance monitor circuit and the design which is to be monitored as well as to minimize additional hardware effort and energy overhead for compensation of local variations in hardware performance monitors that are used.

SUMMARY OF THE INVENTION

The object of the invention will be solved by a method for reducing the effect of local process variations of a digital circuit on a hardware performance monitor, the method comprising the following steps:

measuring a set of performance values $c_n$ of the digital circuit by n identical hardware performance monitors, whereas n is a natural number greater than 1, determining an average value $c_{mean}$ of the measured performance values $c_n$, as an approximation of an ideal performance value $c_0$, selecting one performance value $c_j$ of the set of performance values ($c_1, c_2 \ldots c_n$) by a controller, comparing the performance value $c_j$ with a reference value $c_{ref}$ by the controller, resulting in a deviation value $\Delta_c$, controlling an actuator by using the deviation $\Delta_c$ for regulating the global process variations to the approximation $c_{mean}$ of the ideal performance value $c_0$.

Selecting only a single instance $c_j$ of the identical hardware performance monitors has the advantage that power consumption during operation is reduced.

As exemplary shown in FIG. 1 the hardware performance monitors (HPMs) are replicated as n identical instances. Each of the HPMs in the group can be read out individually, resulting in a performance value $c_j$ (with j in the range from 1 to n). The read-out can be realized by a signal converter, for example a counter, measuring the relative frequency of a ring-oscillator HPM compared to a frequency of a reference clock signal.

In a closed loop regulation scheme, the hardware performance monitor output c is compared to a reference value cref, which is typically stored in a register. A deviation between c and cref is used for control of an actor, e.g. a body bias generator or a supply voltage regulator. Hence, it is possible to adjust, regulate or control one or more bias parameters, such as e.g. supply voltages or bias voltages.

The set of identical HPMs undergoes local process variation, resulting in a set of performance values cj deviating from the ideal performance value c0 without local process variation. In a wide range of implementations, the underlying distribution can be assumed to be approximately normal with standard deviation σc. In an even wider range of implementations, the average cmean of the performance values cj is a better approximation of the ideal performance value c0 without local mismatch than the individual performance values cj. In case of a Gaussian distribution, the standard deviation can be reduced by averaging n hardware performance monitor outputs to $1/\sqrt{n} \cdot \sigma c$. Therefore, the distribution can be narrowed and the error/deviation from c0 can be reduced.

In an embodiment of the inventive method, the average value cmean is determined by adding the performance values cn of the n hardware performance monitors and dividing the sum by n. As stated above, in a very wide range of implementations, the average cmean of the performance values cj is a better approximation of the ideal performance value c0 without local mismatch than the individual performance values cj.

In a further embodiment of the inventive method, the selected performance value cj is used for determining a mismatch scaling factor g by g=cmean/cj, whereas the scaling factor g is used for updating the reference value cref to $c'_{ref}$=cref/g before controlling the actuator. This has the advantage that the closed loop regulation of the actuator bias voltage can be executed based on a single reference value, of $c'_{ref}$, as it would have been done without mismatch reduction.

In another embodiment of the inventive method, the actuator is controlled by the deviation $\Delta c = c'_{ref} - cj$. By updating $c'_{ref}$ and using the selected performance value cj this results in the advantage, that the actual local variation of the HPMs, resulting in a relative deviation of g not equal 1, can be considered for the closed loop regulation of the actuator voltage, as it might have been considered using nominal case simulations. A procedure for nominal case simulations is claimed and disclosed in PCT/EP2018/050947.

It is also possible according to one embodiment of the inventive method, that the performance value cj is selected by a criterion therein that said performance value cj is closest to cmean. This has the advantage that the worst case mismatch influence on the regulation target value is reduced without any additional calculation effort of hardware components.

In a preferred embodiment of the inventive method, the actuator is adjusted until cref=cmean, before the selected performance value cj is used for updating the reference value cref to $c'_{ref}$=cj and before continuing the controlling of the actuator with only the one selected performance value cj of the one hardware performance monitor j. Updating the reference value cref to $c'_{ref}$ in the described way has the advantage that the regulation based on multiple instances of the performance monitors has to be only executed once in a calibration step and the mismatch value of a particular, selected performance monitor instance j is directly cancelled by setting the reference value to the performance value of monitor j at the reference conditions.

In another embodiment of the inventive method it is also possible to use a low-pass integral loop filter as a controller which uses only one performance value $c_j$ of the set of performance values c of n identical hardware performance monitors in one regulation step of the actuator, whereas the control loop is continuously performed until all performance values $c_n$ has been used consecutively, whereas an average deviation of $(c_{mean} - c_{ref})$ determined in each regulation step is averaged and stored in an integrator register of the integral loop filter. This has the advantage that no additional calculation effort or hardware components are required to determine the average performance value, since averaging is performed by means of the low-pass integral loop filter.

In another embodiment of the inventive method a low-pass integral loop filter as a controller is used, the controller uses only one performance value $c_j$ of the set of performance values $c_n$ of n identical hardware performance monitors in one regulation step of the actuator, whereas the control loop is continuously performed until all performance values $c_n$ has been non-deterministic selected and used, whereas an average deviation of $(c_{mean} - c_{ref})$ determined in each regulation step is averaged and stored in an integrator register of the integral loop filter.

In another preferred embodiment of the inventive method, one or more hardware performance monitors are excluded from being selected. It is therefore possible to mask large variations from a mean value in order to improve the robustness and yield of the integrated circuits.

In further preferred embodiment of the inventive method a mismatch of the hardware performance monitors are additionally considered during a timing and power characterization process of digital components, by means of calculating a deviation of the bias voltages $\Delta V$ from a previously simulated standard deviation of the hardware performance monitor results and considering this as pessimism for a library characterization. It is advantageous when the mismatch of the hardware performance monitors is considered during modelling of the closed loop bias regulations. Especially when the resulting bias voltages (e.g. N-Well and P-Well voltages) are required as parameter for timing and power characterization of digital circuit components (e.g. standard cells, memory macros), which are operated in the regulated digital design domain. The mismatch of the hardware performance monitor can be considered by means of safety margins (pessimisms) for the bias voltages.

The objective of the invention will also be solved by an apparatus for reducing the effect of local process variations of an integrated circuit on hardware performance monitors and which is able to perform the inventive method. The apparatus comprises a digital circuit, a control unit, an actuator and a set of n identical hardware performance monitors monitoring performance values of the digital circuit, whereas the control unit, the actuator, the digital circuit and the set of hardware performance monitors forming a closed control loop, and whereas the control unit comprises a signal converter and a controller for selecting and performing the control signals for the actuator.

As exemplary shown in FIG. 1 the hardware performance monitors (HPMs) are replicated as n identical instances. Each of the HPMs in the group can be read out individually by a signal converter, for example a counter, measuring the relative frequency of a ring-oscillator HPM compared to a frequency of a reference clock signal and resulting in a performance value $c_j$ (with j in the range from 1 to n). In the closed loop regulation scheme composed of the hardware performance monitors, the signal converter, a controller, at least one actuator and the digital circuit that is monitored by the HPMs, the hardware performance monitor output c is compared to a reference value $c_{ref}$, which is typically stored in a register. A deviation between c and $c_{ref}$ is used for control of at least one actor, e.g. a body bias generator or a supply voltage regulator. Hence, it is possible to adjust, regulate or control one or more bias parameters, such as e.g. supply voltages or bias voltages with the inventive apparatus.

The mismatch of the hardware performance monitors has to be considered during modelling of the closed loop bias regulations. Especially when the resulting bias voltages (e.g. N-Well and P-Well voltages) are required as parameter for timing and power characterization of digital circuit components (e.g. standard cells, memory macros), which are operated in the regulated digital design domain. The mismatch of the hardware performance monitor can be considered by means of safety margins (pessimisms) for the bias voltages.

In further embodiments of the inventive apparatus, the controller is linear, especially a proportional-integral filter or comprises non-linear elements. For a proportional-integral PI filter the input would by $c-c_{ref}$, and for a controller with non-linear elements the input would be a binary decision sign $(c-c_{ref})$.

In another preferred embodiment of the inventive apparatus, the actuator is a body bias generator or a supply voltage generator controlled adaptively for the digital circuit. With the inventive apparatus it is possible to adjust, regulate or control one or more bias parameters, such as e.g. supply voltages or bias voltages.

In a further embodiment the apparatus comprises two hardware performance monitors, more preferred three hardware performance monitors, especially preferred four hardware performance monitors. This has the advantage that an average performance value $c_{mean}$ of the performance values $c_j$ can be used for the regulation, because this is a better approximation of the ideal performance value $c_0$ without local mismatch than the individual performance values $c_j$. In case of a Gaussian distribution, the standard deviation can be reduced by averaging n hardware performance monitor outputs to $1/sqrt(n) \cdot \sigma_c$. Therefore, the distribution can be narrowed and the error/deviation from $c_0$ can be reduced.

The advantages of the invention can be summarized as follow: The accuracy of the monitoring of the design of ICs by HPMS can be improved by the reduction of the effect of local process variations on the hardware performance monitors. Hence, the robustness against deviations and malfunctions in hardware performance monitors can be increased and furthermore, there will be only a marginal increase of power consumption when operating the closed control loop.

The invention will be explained in more detail using exemplary embodiments.

BRIEF DESCRIPTION OF THE DRAWING FIGURES

The Appended Drawings Show

Figure 2:
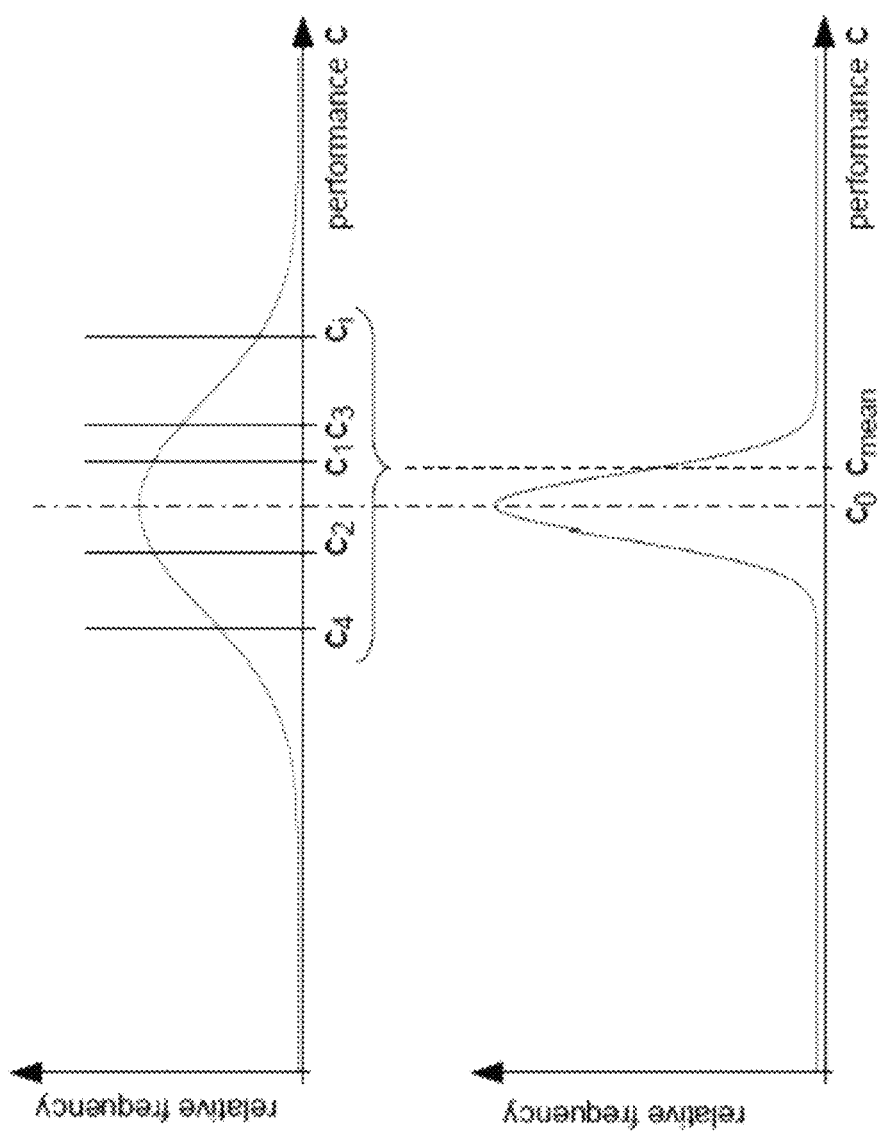

FIG. 1 Block diagram of the closed loop system for adaptive bias regulation with multiple hardware performance monitors;

FIG. 2 Illustration of a) the random distribution of the hardware performance monitor read-out results c and b) the narrowed distribution of the mean value $c_{mean}$ of a number of n sensor values.

DETAILED DESCRIPTION

In a first embodiment of the inventive method, multiple hardware performance values $c_1, c_2 \ldots c_n$ are read out, forming an initial mismatch calibration step. Afterwards these read-out values are used to determine an average value $c_{mean}$ (FIG. 2) by adding all $c_j$ in consecutive read-outs and dividing the sum by n. The division can be realized as digital binary shift operation in case n is a power of 2. Then one hardware performance value $c_j$ out of the n hardware performance monitor values is picked. With this value $c_j$ a mismatch scaling factor g by $g=c_{mean}/c_j$ is determined, which is the correction factor of the individual HPM value to the mean value. The stored reference value $c_{ref}$ is updated to $c'_{ref}=c_{ref}/g=c_{ref}/c_{mean} \cdot c_j$. This requires the arithmetic operation of a division. At last the regulation is run with the selected hardware performance j.

In a second embodiment of the inventive method, multiple hardware performance values $c_1, c_2 \ldots c_n$ are read out, forming an initial mismatch calibration step. Afterwards these read-out values are used to determine an average value $c_{mean}$ by adding all $c_j$ consecutive read-outs and dividing the sum by n. The division can be realized as digital binary shift operation in case n is a power of 2. Then one hardware performance value $c_j$ whose read-out value $c_j$ is closest to $c_{mean}$ is picked. At last, the regulation is run with the selected hardware performance j.

In a third embodiment, for each regulation step all n hardware performance values $c_1, c_2 \ldots c_n$ are read out, and these read-out values are used to determine an average value $c_{mean}$ by adding all $c_j$ in consecutive read-outs and dividing the sum by n. The mean value $c_{mean}$ is compared to $c_{ref}$ and the actuator is adjusted. After the loop has settled, which means that $c_{mean}=c_{ref}$, one hardware performance value $c_j$ out of the n hardware performance monitor values is picked. The value $c_j$ is read out. Afterwards, the stored reference value $c_{ref}$ is updated to $c'_{ref}=c_j$. As advantage, this does not require the arithmetic operation of a division. At last, the regulation is run with only a selected performance j.

In a fourth embodiment and in case a loop filter with low-pass integral characteristics is used, the regulation is performed using multiple HPMs. In each regulation step, only one HPM is read. In consecutive regulation steps the next HPM from the set is read. Therefore, the closed loop regulation continuously cycles through the HPMs. The integrator register of the digital low pass filter is used for averaging, i.e. storing the average deviation (cmean–cref). No additional arithmetic circuits are required. In case a PI controller is used, the proportional gain should be low to suppress the error of successive read-outs of hardware performance monitors with a mismatch from cmean.

In a fifth embodiment and in case a loop filter with low-pass integral characteristics is used, the regulation is performed using multiple HPMs. In each regulation step, only one HPM 2 is read. In consecutive regulation steps another HPM 2 from the set is read. The HPM 2 to be read next is selected by an algorithm, including deterministic pseudo random selection, and also including non-deterministic random selection. The integrator register of the digital low pass filter is used for averaging, i.e. storing the average deviation (cmean–cref). No additional arithmetic circuits are required. In case a PI controller is used, the proportional gain should be low to suppress the error of successive read-outs of hardware performance monitors with mismatch from cmean.

The mismatch of the hardware performance monitors has to be considered during modelling of the closed loop bias regulations. Especially when the resulting bias voltages (e.g. N-Well and P-Well voltages) are required as parameter for timing and power characterization of digital circuit components (e.g. standard cells, memory macros), which are operated in the regulated digital design domain. The mismatch of the hardware performance monitor can be considered by means of safety margins (pessimisms) for the bias voltages.

The determination of body bias pessimism or also called safety margins for consideration of variability in these voltages can be addressed as follows: If a single bias voltage V1 is considered (e.g. bias VDD in adaptive voltage scaling, single well adaptive body biasing) a linearized sensitivity k1 between the bias voltage V1 and a hardware performance monitor count value c can be determined with k1=dc/dV1, by means of circuit simulations or measurements; then a standard deviation σc of the hardware performance monitor result c from Monte Carlo simulations or statistical measurements is determined. Afterward, a safety margin $\Delta V1$ for p-sigma pessimism (e.g. p=3) by $\Delta V1 = n \cdot \sigma c / k1$ is determined. This safety margin $\Delta V1$ is optionally and additionally considered for characterization of standard cell in an integrated circuit.

In another case, if two bias voltages [V1, V2] are considered (e.g. adaptive body bias with n-well and p-well voltages), and two hardware performance monitors with results c1 and c2 are used in the regulation loop. For this setup selective, linearized sensitivities are determined, organized as matrix $A=[k_{11}, k_{12}; k_{21}, k_{22}]$ with
$k_{11} = dc_1/dV_1$
$k_{12} = dc_1/dV_2$
$k_{21} = dc_2/dV_1$
$k_{22} = dc_2/dV_2$.
A standard deviation vector $b=[\sigma_{c1}, \sigma_{c2}]$ of the hardware performance monitor result $c_1$ and $c_2$ from Monte Carlo simulations or statistical measurements is determined. Therewith, a vector of safety margins $v=[\Delta V_1, \Delta V_2]$ by $v = A^{-1} \cdot b$ (the inverse of matrix A multiplied with the vector b) is calculated. These safety margins $\Delta V_1$ and $\Delta V_2$ can be optionally and additionally considered for characterization of standard cell in an integrated circuit.

In another case, if n (n>2) bias voltages and n PVT hardware performance monitors are used, the previous explained procedure can be applied, but with generalizes a n-by-n matrix A and vectors b and v of length n.

The safety margins $\Delta V$ are considered in the characterization process of standard integrated circuits by:
Slow timing: Addition or subtraction of $\Delta V$ such that the resulting pessimism leads to slower timing
Typical timing: No addition or subtraction of $\Delta V$
Fast timing: Addition or subtraction of $\Delta V$ such that the resulting pessimism leads to faster timing.

The library characterization of the circuit blocks in the regulated domain is performed with these margins considered.

The pessimism or safety margins of the bias voltages will be illustrated by two examples.

Example 1

One regulated supply voltage VDD for adaptive voltage scaling is considered: $\Delta V_1 = \Delta VDD$ (supply voltage), with $\Delta V_1 = \Delta VDD > 0$, the safety margin is added to the nominal values of $VDD_0$ as described:
Slow timing: $(VDD) = (VDD_0 - \Delta VDD)$
Typical timing: $(VDD) = (VDD_0)$
Fast timing: $(VDD) = (VDD_0 + \Delta VDD)$

Example 2

Two bias voltages for adaptive body biasing are considered: $\Delta V_1 = \Delta VPW_j$ (p-well voltage pessimism for hardware performance monitor j) $\Delta V_2 = \Delta VNW_j$ (n-well voltage for hardware performance monitor j), with $\Delta V_1 > 0$ and $\Delta V_2 > 0$ based on the inventive method for characterization of a standard cell, the safety margins $\Delta VNWs$ and $\Delta VPWs$, representing the hardware performance monitor mismatch, are added to the nominal values of $VNW_{c0}$ and $VPW_{c0}$, additionally to the $\Delta VNW_a$ and $\Delta VPW_a$ actuator pessimism, which considers static and dynamic mismatch of the bias voltage actuators (e.g. charge pumps):

Forward Body Biasing (FBB):
Slow timing: $(VPW_c, VNW_c) = (VNW_{c0} - \Delta VNW_a - \Delta VNW_s, VPW_{c0} + \Delta VPW_a + \Delta VPW_s)$
Typical timing: $(VPW_c, VNW_c) = (VNW_{c0}, VPW_{c0})$
Fast timing: $(VPW_c, VNW_c) = (VNW_{c0} + \Delta VNW_a + \Delta VNW_j, VPW_{c0} - \Delta VPW_a - \Delta VPW_j)$
Reverse Body Biasing (RBB):
Slow timing: $(VPW_c, VNW_c) = (VNW_{c0} + \Delta VNW_a + \Delta VNW_s, VPW_{c0} - \Delta VPW_a - \Delta VPWs)$
Typical timing: $(VPW_c, VNW_c) = (VNW_{c0}, VPW_{c0})$
Fast timing: $(VPW_c, VNW_c) = (VNW_{c0} - \Delta VNW_a - \Delta VNW_s, VPW_{c0} + \Delta VPW_a + \Delta VPW_s)$,
whereas s stands for the mismatch sensitivity. This term describes the additional safety margin due to mismatch of the hardware performance monitors.

The invention allows to consider the adaptive bias voltages, e.g. VNW and VPW which are present in the operation of the circuit, e.g. when operated in a closed loop biasing scheme with hardware performance monitor, during cell characterization and implementation. Thereby, pessimisms are reduced and better power performance and area results can be obtained.

In the following, the invention will be illustrated by two concrete embodiments, on the one hand using a single hardware performance monitor as state of the art and on the other hand using four performance monitors according to the invention:

Using a single hardware performance monitor, its nominal output c (period_mean, period) and standard deviation $\sigma_c$ (period_std) is determined. Afterwards the sensitivities k are determined, and $\Delta_{V1} = \Delta VPW_s$ (dVPW) and $\Delta_{V1} = \Delta VNW_s$ (dVNW) are calculated by means of the second embodiment as described above (with p=3 sigma). This is repeated for different corner settings of a standard cell. E.g. this results in dVPW=111 mW and dVNW=100 mV (at corner worst case: VDD=0.36V T=−40° C.) pessimism which has to be considered during characterization.

Using four hardware performance monitors 2 and average their results by means of the invention, its nominal output c (period_mean, period) and standard deviation σc (period_std) of the averaged result $c_{mean}$ is determined. Afterwards, the sensitivities k are determined, and $\Delta V_1 = \Delta VPW_s$ (dVPW) and $\Delta V_1 = \Delta VNW_s$ (dVNW) are calculated by means of the second embodiment as described above (with p=3 sigma). This is repeated for different corner settings of a standard cell. E.g. this results in dVPW=54 mW and dVNW=51 mV (at corner worst case VDD=0.36V T=−40° C.) pessimism which has to be considered during characterization.

By means of the invention the variability of the hardware performance monitor(s) in the regulation loop and thereby the required pessimism for characterization is reduced by approx. factor 2 when using four hardware performance monitors.

LIST OF REFERENCE SIGNS 1 integrated circuit
2 hardware performance monitor
3 digital circuit
4 control unit
5 signal converter
6 controller
7 actuator
8 reference value register
9 closed control loop
10 reference value
11 reference clock signal

The invention claimed is:

1. A method for reducing an effect of local process variations within an integrated circuit, the method comprising the following steps:
measuring a set of performance values ($c_1, c_2 \ldots c_n$) of a digital circuit within the integrated circuit by means of n identically designed hardware performance monitors, whereas n is a natural number greater than 1;
determining an average value $c_{mean}$ of the measured performance values ($c_1, c_2 \ldots c_n$) as an approximation of an ideal performance value $c_0$;
selecting one performance value $c_j$ of the set of performance values ($c_1, c_2 \ldots c_n$) by a controller;
comparing the performance value $c_j$ with a reference value $c_{ref}$ by the controller, resulting in a deviation value $\Delta c$; and
controlling an actuator using the deviation $\Delta c$ and
wherein the controller controls the actuator in a closed control loop, the controller comprises a low-pass integral loop filter, the controller uses only one performance value $c_j$ of the set of performance values of n identically designed hardware performance monitors at a time, the control loop is continuously performed until all performance values $c_n$ have been used consecutively, and deviation $\Delta c$ determined for each performance value $c_j$ is averaged and stored in an integrator register of the low-pass integral loop filter.

2. The method according to claim 1, wherein the average value $c_{mean}$ is determined by adding the performance values ($c_1, c_2 \ldots c_n$) of the n hardware performance monitors and dividing the sum by n.

3. The method according to claim 2, wherein the selected performance value $c_j$ is used for determining a mismatch scaling factor g by $g=c_{mean}/c_j$, whereas the scaling factor g is used for updating the reference value $c_{ref}$ to $c'_{ref}=c_{ref}/g$ before controlling the actuator.

4. The method according to claim 3, wherein the actuator is controlled by the deviation $\Delta c=c'_{ref}-c_j$.

5. The method according to claim 2, wherein the performance value $c_j$ is selected by a criterion therein that said performance value $c_j$ is closest to $c_{mean}$.

6. The method according to claim 3, wherein actuator is controlled using only the one selected performance value $c_j$ of the one selected hardware performance monitor j until $c'_{ref}=c_j$, and $\Delta c=0$.

7. The method according to claim 1, wherein the controller controls the actuator in the closed control loop, the controller comprises the low-pass integral loop filter the controller uses only one performance value $c_j$ of the set of performance values ($c_1, c_2 \ldots c_n$) of n identical hardware performance monitors at a time, the control loop is continuously performed until all performance values $c_n$ have been non-deterministically selected and used, and deviation $\Delta c$ determined for each performance value $c_j$ is averaged and stored in the integrator register of the low-pass integral loop filter.

8. The method according to claim 7, wherein one or more hardware performance monitors are excluded from being selected.

9. The method according to claim 8, wherein the actuator sets one or more bias voltages affecting speed or power or both of the digital circuit, mismatch of the hardware performance monitors is additionally considered during a timing and power characterization process of components used in the digital circuit, by means of calculating a deviation $\Delta V$ of the bias voltages a previously simulated standard deviation of the hardware performance monitor results and considering this deviation $\Delta V$ as a pessimism in a library characterization of components used in the digital circuit.

10. An apparatus for reducing an effect of local process variations on hardware performance monitors within an integrated circuit the apparatus performing the method according to claim 1, the apparatus comprising a digital circuit, a controller, an actuator and a set of n identically designed hardware performance monitors monitoring performance values of the digital circuit, whereas the controller, the actuator, the digital circuit and the set of hardware performance monitors form a closed control loop, and whereas the controller comprises a signal converter and performs closed-loop control by selecting and applying control signals to the actuator.

11. The apparatus according to claim 10, wherein the controller comprises a linear filter, especially a proportional-integral filter, or the controller comprises non-linear elements.

12. The apparatus according to claim 10, wherein the actuator is an adaptively controlled body bias generator or an adaptively controlled supply voltage generator for the digital circuit.

13. The apparatus according to claim 10, wherein the apparatus comprises two hardware performance monitors, more preferred three hardware performance monitors, especially preferred four hardware performance monitors.

14. The method according to claim 1, wherein the actuator is controlled by the deviation $\Delta c=c'_{ref}-c_j$.

15. The method according to claim 1, wherein one or more hardware performance monitors are excluded from being selected.

16. The method according to claim 1, wherein the actuator sets one or more bias voltages affecting speed or power or both of the digital circuit, mismatch of the hardware performance monitors is additionally considered during a timing and power characterization process of components used in the digital circuit, by means of calculating a deviation $\Delta V$ of the bias voltages from a previously simulated standard deviation of the hardware performance monitor results and considering this deviation $\Delta V$ as a pessimism in a library characterization of components used in the digital circuit.

17. The method according to claim 2, wherein the actuator is controlled using only the one selected performance value $c_j$ of the one selected hardware performance monitor j until $c'_{ref}=c_j$, and $\Delta c=0$.

18. A method for reducing an effect of local process variations within an integrated circuit, the method comprising the following steps:
measuring a set of performance values ($c_1, c_2 \ldots c_n$) of a digital circuit within the integrated circuit by means of n identically designed hardware performance monitors, whereas n is a natural number greater than 1;
determining an average value $c_{mean}$ of the measured performance values ($c_1, c_2 \ldots c_n$) as an approximation of an ideal performance value $c_0$;
selecting one performance value $c_j$ of the set of performance values ($c_1, c_2 \ldots c_n$) by a controller;
comparing the performance value $c_j$ with a reference value $c_{ref}$ by the controller, resulting in a deviation value $\Delta c$; and
controlling an actuator using the deviation $\Delta c$; and
wherein the controller controls the actuator in a closed control loop, the controller comprises a low-pass integral loop filter, the controller uses only one performance value $c_j$ of the set of performance values c of n identical hardware performance monitors at a time, the control loop is continuously performed until all performance values $c_n$ have been non-deterministically selected and used, and deviation $\Delta c$ determined for each performance value $c_j$ is averaged and stored in an integrator register of the low-pass integral loop filter.

19. The method according to claim 18, wherein one or more hardware performance monitors are excluded from being selected.

20. The method according to claim 19, wherein the actuator sets one or more bias voltages affecting speed or power or both of the digital circuit, mismatch of the hardware performance monitors is additionally considered during a timing and power characterization process of components used in the digital circuit, by means of calculating a deviation $\Delta V$ of the bias voltages from a previously simulated standard deviation of the hardware performance monitor results and considering this deviation $\Delta V$ as a pessimism in a library characterization of components used in the digital circuit.

21. The method according to claim 18, wherein the average value $c_{mean}$ is determined by adding the performance values $(c_1, c_2 \ldots c_n)$ of the n hardware performance monitors and dividing the sum by n.

22. The method according to claim 21, wherein the selected performance value $c_j$ is used for determining a mismatch scaling factor g by $g=c_{mean}/c_j$, whereas the scaling factor g is used for updating the reference value $c_{ref}$ to $c'_{ref}=c_{ref}/g$ before controlling the actuator.

23. The method according to claim 22, wherein the actuator is controlled by the deviation $\Delta c=c'_{ref}-c_j$.

24. The method according to claim 21, wherein the performance value $c_j$ is selected by a criterion therein that said performance value $c_j$ is closest to $c_{mean}$.

25. The method according to claim 22, wherein the actuator is controlled using only the one selected performance value $c_j$ of the one selected hardware performance monitor j until $c'_{ref}=c_j$, and $\Delta c=0$.

26. The method according to claim 18, wherein the actuator is controlled by the deviation $\Delta c=c'_{ref}-c_j$.

27. The method according to claim 18, wherein one or more hardware performance monitors are excluded from being selected.

28. The method according to claim 18, wherein the actuator sets one or more bias voltages affecting speed or power or both of the digital circuit, mismatch of the hardware performance monitors is additionally considered during a timing and power characterization process of components used in the digital circuit, by means of calculating a deviation $\Delta V$ of the bias voltages from a previously simulated standard deviation of the hardware performance monitor results and considering this deviation $\Delta V$ as a pessimism in a library characterization of components used in the digital circuit.

29. The method according to claim 21, wherein the actuator is controlled using only the one selected performance value $c_j$ of the one selected hardware performance monitor j until $c'_{ref}=c_j$, and $\Delta c=0$.

30. An apparatus for reducing an effect of local process variations on hardware performance monitors within an integrated circuit, the apparatus performing the method according to claim 18, the apparatus comprising a digital circuit, a controller, an actuator and a set of n identically designed hardware performance monitors monitoring performance values of the digital circuit, whereas the controller, the actuator, the digital circuit and the set of hardware performance monitors form a closed control loop, and whereas the controller comprises a signal converter and performs closed-loop control by selecting and applying control signals to the actuator.

31. The apparatus according to claim 30, wherein the controller comprises a linear filter, especially a proportional-integral filter, or the controller comprises non-linear elements.

32. The apparatus according to claim 30, wherein the actuator is an adaptively controlled body bias generator or an adaptively controlled supply voltage generator for the digital circuit.

33. The apparatus according to claim 30, wherein the apparatus comprises two hardware performance monitors, more preferred three hardware performance monitors, especially preferred four hardware performance monitors.

* * * * *